(12) United States Patent
Bihel et al.

(10) Patent No.: US 9,428,262 B2
(45) Date of Patent: Aug. 30, 2016

(54) AIRCRAFT HYDRAULIC SYSTEM COMPRISING AT LEAST ONE SERVO-CONTROL, AND AN ASSOCIATED ROTOR AND AIRCRAFT

(71) Applicant: AIRBUS HELICOPTERS, Marignane (FR)

(72) Inventors: Jean-Romain Bihel, Le Rove (FR); Clement Coic, Aix en Provence (FR); Thibaut Marger, Gignac-la-Nerthe (FR); Gerard Couderc, Vitrolles (FR)

(73) Assignee: Airbus Helicopters, Marignane (FR)

( * ) Notice: Subject to any disclaimer, the term of this patent is extended or adjusted under 35 U.S.C. 154(b) by 0 days.

(21) Appl. No.: 14/686,001

(22) Filed: Apr. 14, 2015

(65) Prior Publication Data

US 2015/0298796 A1    Oct. 22, 2015

(51) Int. Cl.
| | |
|---|---|
| *B64C 13/36* | (2006.01) |
| *B64C 13/42* | (2006.01) |
| *B64C 27/64* | (2006.01) |
| *F15B 15/14* | (2006.01) |

(52) U.S. Cl.
CPC .............. *B64C 13/42* (2013.01); *B64C 27/64* (2013.01); *F15B 15/1452* (2013.01); *F15B 15/1461* (2013.01)

(58) Field of Classification Search
CPC ....... B64C 13/38; B64C 13/40; B64C 13/42; B64C 27/54; B64C 27/64; B64C 27/605
USPC .............................................. 244/78.1, 78.2
See application file for complete search history.

(56) References Cited

U.S. PATENT DOCUMENTS

| | | | | |
|---|---|---|---|---|
| 2,861,640 | A | * 11/1958 | Du Pont Stephen | ... B64C 27/41 416/102 |
| 3,007,530 | A | 11/1961 | Doman et al. | |
| 3,080,002 | A | 3/1963 | Du Pont | |
| 4,084,668 | A | 4/1978 | Rybicki | |
| 4,105,365 | A | * 8/1978 | Ferris | ...................... B64C 27/51 416/107 |
| 5,387,083 | A | * 2/1995 | Larson | .................. B64C 27/615 416/23 |
| 2015/0298796 | A1 | 10/2015 | Bihel et al. | |

FOREIGN PATENT DOCUMENTS

| | | |
|---|---|---|
| EP | 2933186 A1 | 10/2015 |
| FR | 2313603 | 12/1976 |

(Continued)

OTHER PUBLICATIONS

French Search Report for FR 1400938, Completed by the French Patent Office on Jan. 8, 2015, 6 Pages.

(Continued)

*Primary Examiner* — Richard G Davis
(74) *Attorney, Agent, or Firm* — Brooks Kushman P.C.

(57) ABSTRACT

A hydraulic system of an aircraft, the system comprising at least one servo-control, each servo-control comprising at least one cylinder together with a drive rod and a piston arranged in each cylinder. Between each cylinder of servo-control and the drive rod of that servo-control, at least one servo-control presents main sealing means with controlled leakage allowing a hydraulic fluid to leak out from the cylinder, the hydraulic system further comprising at least one enclosure, each cylinder of the servo-control being arranged inside the enclosure so that the fluid is collected in the enclosure.

20 Claims, 4 Drawing Sheets

(56) References Cited

FOREIGN PATENT DOCUMENTS

| FR | 3020038 | A1 | 10/2015 | | |
|----|---------|----|---------|--|--|
| GB | 2026406 |    | 2/1980  | | |
| GB | 2026406 | A * | 2/1980 | ............. | B64C 13/40 |

OTHER PUBLICATIONS

European Search Report Dated Sep. 10, 2015, Application No. EP 15 00 0848, 4 Pages.

\* cited by examiner

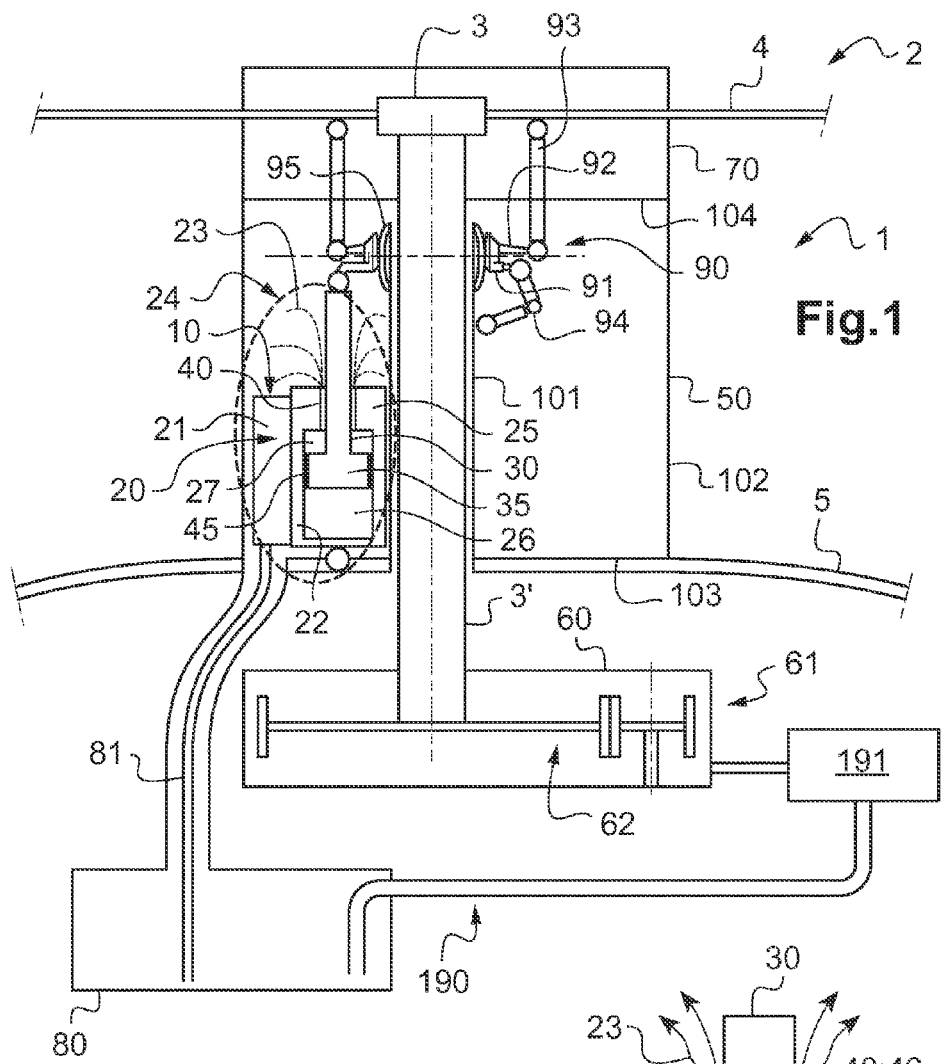
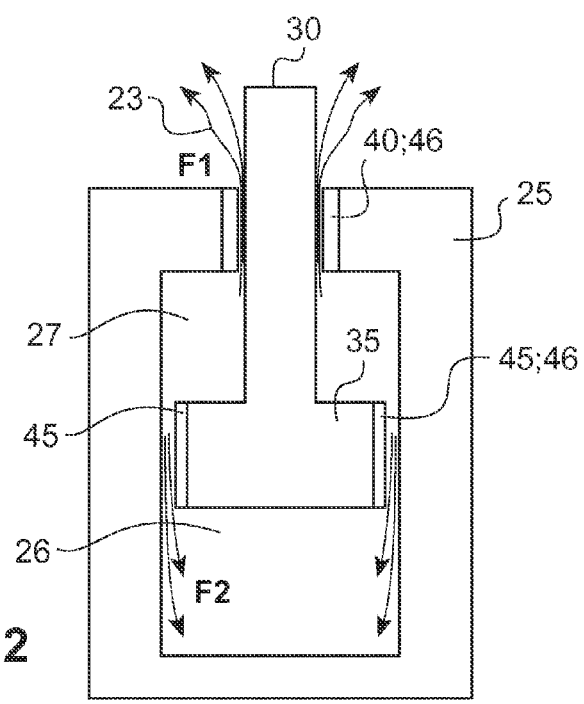

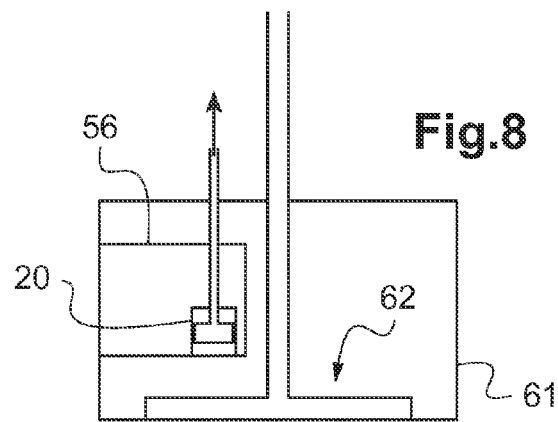
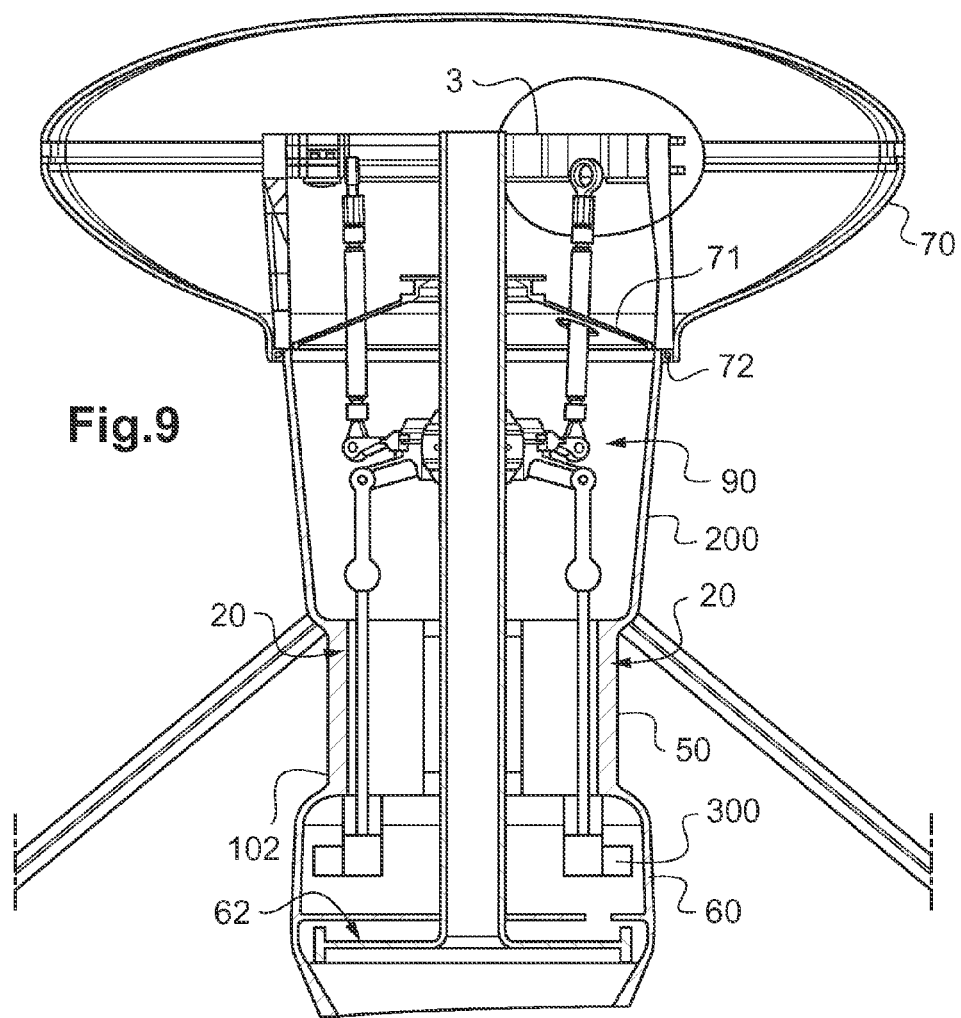

AIRCRAFT HYDRAULIC SYSTEM COMPRISING AT LEAST ONE SERVO-CONTROL, AND AN ASSOCIATED ROTOR AND AIRCRAFT

CROSS REFERENCE TO RELATED APPLICATION

This application claims priority to French patent application No. FR 14 00938 filed on Apr. 18, 2014, the disclosure of which is incorporated in its entirety by reference herein.

BACKGROUND OF THE INVENTION (1) Field of the Invention

The present invention relates to an aircraft hydraulic system comprising at least one servo-control, and also to a rotor and to an aircraft fitted with the hydraulic system.

(2) Description of Related Art

Conventionally, an aircraft has control members, such as the blades of a rotor providing a rotorcraft with lift, or indeed the control surfaces of an airplane, for example.

Using flight controls, the pilot thus operates the control members of the aircraft. Nevertheless, the forces that need to be delivered in order to move such control members are sometimes very large.

Consequently, the linkage connecting a flight control to a control member is often provided with a hydraulic system including a servo-control enabling the pilot to control the aircraft without difficulty and accurately.

More particularly, a rotorcraft has a main rotor providing the rotorcraft with at least some of its lift and possibly also with propulsion. In order to direct the rotorcraft, the pilot can in particular modify the pitch of the blades of the main rotor.

Consequently, the rotorcraft has a "set of swashplates" comprising a non-rotary bottom swashplate and a rotary top swashplate. Below, this set is indeed referred to as a set of swashplates. In contrast, it should be understood that the person skilled in the art sometimes refers to this set of swashplates more simply as the "swashplates". The non-rotary bottom swashplate is connected to the pilot's flight controls, generally via at least three distinct control systems, while the rotary top swashplate is connected to each of the blades via a respective rod. The set of swashplates thus slides along the mast of the main rotor in order to control the collective pitch of the blades of the main rotor. Furthermore, this set of swashplates can oscillate about a ball joint slidably mounted on the mast in order to control the cyclic pitch of the blades.

The movements in oscillation and in translation of the set of swashplates thus serve to vary the pitch of the blades and thereby enable a pilot specifically to direct a rotorcraft.

The pilot sometimes controls the set of swashplates via mechanical controls. Nevertheless, the forces a pilot needs to exert in order to move the set of swashplates are very large, in particular when the weight of the rotorcraft is also large.

Consequently, a servo-control is arranged between an upstream portion and a downstream portion of each controlled-linkage system. The pilot then acts on the servo-controls without applying large amounts of force via the upstream portion, and the servo-controls copy an order from the pilot so as to act on the downstream portion of the linkage system.

Likewise, a helicopter has a tail rotor and the pitch of its blades can be modified by means of a servo-control in order to control yaw movements of the aircraft.

Naturally, the same applies for example to the ailerons or the flaps of airplanes when they are controlled via servo-controls.

Usually, a servo-control includes an actuator having at least an outer cylinder and a drive rod. The drive rod then has a control piston. Each control piston can move in translation inside a corresponding cylinder. Thus, each control piston defines a retraction chamber and an extension chamber inside the corresponding outer cylinder.

Furthermore, the servo-control has a hydraulic valve for feeding fluid to the retraction chamber or to the extension chamber depending on the received order.

A piloting order from a pilot is thus transmitted to the hydraulic valve, and it is the hydraulic valve that feeds fluid to the appropriate hydraulic chambers. As a function of the orders that are given, the hydraulic valve thus feeds hydraulic fluid to each retraction chamber or to each extension chamber, and consequently causes the servo-control to retract or to extent.

It should be understood that in the text below, the term "retraction chamber" is used to refer to a chamber causing the servo-control to retract when said chamber is filled with a fluid. Conversely, the term "extension chamber" is used to designate a chamber that causes the servo-control to extend when said chamber is filled with a fluid.

The servo-control may also comprise a servo-control device, possibly incorporated in the hydraulic valve.

The servo-control then has multiple dynamic gaskets arranged on its moving parts.

A first dynamic gasket may be arranged on each control piston. Such a dynamic gasket serves to prevent undesired passage of fluid from the retraction chamber to the extension chamber of a cylinder.

A first dynamic gasket that leaks can lead to a degradation in the performance of the servo-control.

A second dynamic gasket is also arranged between the drive rod and the corresponding cylinder of the servo-control.

A second dynamic gasket that leaks allows fluid to escape to the outside of the servo-control, and consequently onto other pieces of equipment. The leak can be detected by visual inspection and leads to the servo-control being repaired.

One kind of failure for a servo-control thus relates to at least one of its gaskets wearing so as to give rise to a leak.

A servo-control therefore sometimes has a detector device for monitoring the pressure of the fluid of the hydraulic circuit in order to detect a leak that is large. If a large leak is detected, the user is warned and can then undertake measures recommended by the manufacturer. On an aircraft, it is common practice to use servo-controls having at least two cylinders, in particular for safety purposes. Thus, if one cylinder becomes inoperative as a result of an accidental leak, the servo-control can remain functional.

It is also possible to imagine being confronted with so-called "dormant" failures, particularly on a servo-control having at least two cylinders.

Such a dormant failure can appear in the event of a first dynamic gasket leaking Such an intermediate leak may for example allow excessive hydraulic fluid to pass between the retraction chamber and the corresponding extension chamber of a cylinder.

Under such conditions, a pilot runs the risk of not physically perceiving the malfunction of the servo-control insofar as at least one other cylinder of the servo-control remains operational.

In order to detect such dormant failures, a manufacturer may provide for complete maintenance operations to be performed at regular time intervals. Such maintenance operations represent a cost that is not negligible.

In summary, a servo-control is conventionally provided with dynamic gaskets that run the risk of giving rise to excessive leaks in the event of deterioration.

Unfortunately, using a servo-control leads to its dynamic gaskets being heated by friction. Depending on the frequency with which the servo-control is operated, such heating degrades dynamic gaskets and leads to their destruction.

The presence of dynamic gaskets thus constitutes limit on the performance of a servo-control.

Documents GB 2 026 406, U.S. Pat. No. 2,861,640, FR 2 313 603, U.S. Pat. Nos. 4,105,365, 5,387,083, and 3,007,530 are all known.

BRIEF SUMMARY OF THE INVENTION

An object of the present invention is thus to propose an aircraft hydraulic system comprising at least one servo-control, in particular a servo-control acting on control members of an aircraft.

The hydraulic system seeks to limit the limitations imposed on servo-controls as a result of dynamic gaskets leaking Such limitations may in particular give rise to recurrent high maintenance costs, or indeed to a reduction in the performance of the servo-control.

According to the invention, an aircraft hydraulic system comprises at least one servo-control, each servo-control including at least one cylinder together with a drive rod and a piston arranged inside each cylinder, a drive rod of a servo-control being secured to each piston of the servo-control and passing through the corresponding cylinder of the servo-control.

Furthermore, at least one servo-control presents between each cylinder of the servo-control and the drive rod of the servo-control main sealing means with controlled leakage allowing a leak of a hydraulic fluid out from said cylinder, said hydraulic system including at least one closed enclosure, each cylinder of said servo-control being arranged inside said enclosure so that said fluid is collected in said enclosure.

For convenience, such a servo-control is said to be a "controlled-leakage servo-control", given the nature of the main sealing means.

Consequently, the invention proposes firstly making a servo-control that presents leaks that are under control and predefined by the manufacturer, and secondly arranging at least part of the servo-control in an enclosure.

Compared with certain servo-controls, a controlled-leakage servo-control no longer presents a dynamic sealing gasket isolating the inside of a cylinder from a medium outside the servo-control.

Instead of providing a leaktight dynamic gasket that must not allow fluid to seep out, a controlled-leakage servo-control possesses main sealing means that accept an amount of leakage that is predetermined by the manufacturer.

Such a controlled-leakage servo-control thus does not run the risk of being removed from an aircraft as a result of a leak to the outside medium beginning, since such a leak is on the contrary provided for by the manufacturer. This characteristic makes it possible to optimize maintenance by reducing the risk of having a dissatisfied client as a result of an unexpected leak.

Under such circumstances, a controlled-leakage servo-control is arranged in a closed enclosure that is separated from and possibly without contact with the ambient air outside the servo-control.

Hydraulic fluid escaping from the controlled-leakage servo-control is thus contained within a space provided for this purpose. The hydraulic fluid recovered by the enclosure can thus be returned to a hydraulic circuit.

Furthermore, other pieces of equipment of the aircraft may be present inside the enclosure receiving at least one controlled-leakage servo-control. The fluid escaping from a servo-control can then be used for lubricating such equipment.

For example, the enclosure may receive conventional members of a rotorcraft rotor such as the scissors linkages of the swashplates, a set of swashplates, guide parts, . . . .

The hydraulic system then makes it possible to limit and control wear in certain such members. This advantage consequently makes it possible to improve significantly the reliability, the safety in flight, and the maintenance of the aircraft.

Furthermore, the hydraulic system need not have any influence on the locations of the mechanical fastenings of a set of swashplates, thus making the system easier to install.

Finally, it can be understood that the enclosure protects the members arranged inside the enclosure against possible impacts, e.g. with a bird.

Furthermore, the hydraulic system includes a cap for surrounding a hub of a rotor, the enclosure being connected to the cap by a rotary system allowing relative rotary movement between the enclosure and the cap.

The enclosure and the cap may advantageously represent a closed assembly containing the various elements of a rotor, or indeed part or all of a gearbox.

The hydraulic system may also include one or more of the following characteristics.

Thus, the hydraulic system may have a single enclosure, the cylinders of a plurality of servo-controls being arranged inside the enclosure.

For example, all of the servo-controls controlling a rotor may be arranged at least in part in a common enclosure.

Furthermore, at least one servo-control may be arranged completely inside the enclosure.

This characteristic seeks to limit any risk of leakage from the enclosure to the outside.

In addition, the enclosure is advantageously leaktight.

Furthermore, each piston separates a retraction chamber and an extension chamber arranged inside a cylinder, and the hydraulic system may include at least one secondary sealing means with controlled leakage, each secondary sealing means with controlled-leakage being arranged between at least one cylinder and the piston sliding inside the cylinder in order to allow a leak of a hydraulic fluid between the retraction chamber and the extension chamber of the cylinder.

Under such circumstances, the servo-control does not have any dynamic gaskets.

Consequently, the resulting servo-control includes at least one main sealing means with controlled leakage per cylinder, together with at least one secondary sealing means with controlled leakage per cylinder.

This characteristic makes it possible to increase significantly the dynamic performance of the servo-controls. Such performance is no longer limited by the presence of a dynamic gasket.

In order to illustrate this aspect, a prior art servo-control having conventional dynamic gaskets can be operated at a frequency of the order of a few hertz. Conversely, a controlled-leakage servo-control of the invention may be operated at a frequency of the order of several tens of hertz.

Thus, at least one sealing means may include a hydrodynamic bearing.

Main or secondary sealing means may comprise such a hydrodynamic bearing. For example, a hydrodynamic bearing is fastened to a servo-control cylinder facing the drive rod of the servo-control, and/or a hydrodynamic bearing may be fastened to a piston facing an inside surface of the cylinder of the servo-control.

A hydrodynamic bearing may be a component portion of said cylinder or of said piston.

The hydrodynamic bearing may include expansion grooves and/or expansion segments in order to "break" the leakage flow of a fluid passing through the hydrodynamic bearing.

In a first variant, the hydraulic system may be fastened to a fuselage of an aircraft.

In a second variant, the hydraulic system may include a casing of a gearbox in which at least one speed-reduction stage is arranged, the enclosure of a servo-control being fastened to the casing.

In a third variant, said enclosure includes a casing of a gearbox having at least one speed-reduction stage arranged therein.

In a fourth variant, said enclosure is arranged inside a casing of a gearbox having at least one speed-reduction stage arranged therein.

Independently of the variant, the above-mentioned gearbox may be a so-called main gearbox driving a lift rotor, a tail gearbox driving a tail rotor that serves in particular to control yaw movement of the aircraft, or indeed an intermediate gearbox, by way of example. This list is not limiting.

The hydraulic system may also include a fluid tank in fluid flow communication with the enclosure.

The fluid escaping in controlled manner from the servo-control is collected in the enclosure and then returned to the tank of a hydraulic circuit.

The tank may potentially be shared with the tank of a gearbox, for example, in order to share the fluid. The tank may feed fluid to servo-control valves, gearboxes, hydraulic pumps, and certain hydraulic components, in order to optimize the overall cost and weight of the aircraft.

This sharing may also present an ecological aspect by tending to minimize the quantities and types of oils in use, for example.

Thus, the fluid tank may optionally be in fluid flow communication with a hydraulic valve of at least one servo-control.

Furthermore, at least one servo-control may include a single cylinder.

In particular by arranging secondary sealing means between a piston and a cylinder, the invention makes it possible to control the leakage of a fluid from one chamber to another, and to take this leakage into consideration when designing the servo-control.

This control over leaks makes it possible to envisage using single-cylinder servo-controls instead of two-cylinder servo-controls. In contrast, such a single-cylinder servo-control can be connected to a hydraulic valve in fluid flow communication with a hydraulic circuit that is itself made to be redundant.

The servo-control can thus also be controlled by electrical control. A single-cylinder servo-control that is governed electrically greatly simplifies the architecture of the system.

In addition to a hydraulic system, the invention provides a rotor having a hub carrying a plurality of blades. The rotor then has a hydraulic system of the above-described type.

In addition, rotor may have a set of swashplates connected to each of the blades via a respective pitch rod, with each servo-control being connected to said set of swashplates, the set of swashplates possibly being arranged inside the enclosure.

In a variant, the servo-controls may be arranged in the rotary reference frame of the rotor. For example, the servo-controls may be arranged at the roots of the blades. It is thus possible to envisage having a servo-control with an outlet that is rotary rather than linear.

This arrangement of the members of the rotor within the enclosure can tend to reduce wear on the members, in particular on ball joints, on the set of swashplates, and on the scissors linkages, which are all lubricated by the fluid escaping from the servo-controls.

Furthermore, the invention also provides an aircraft having a rotor of the above-described type.

The present invention also provides the method of fabricating the above-described device.

BRIEF DESCRIPTION OF THE SEVERAL VIEWS OF THE DRAWINGS

The invention and its advantages appear in greater detail from the context of the following description of examples given by way of illustration with reference to the accompanying figures, in which:

FIG. 1 is a diagram of a rotor having a hydraulic system in a first variant;

FIG. 2 is a diagram showing a controlled-leakage servo-control;

FIG. 8 is a diagram of a rotor having a hydraulic system in a fourth variant; and FIG. 9 is a diagram showing an enclosure associated with a cap.

Figure 3:
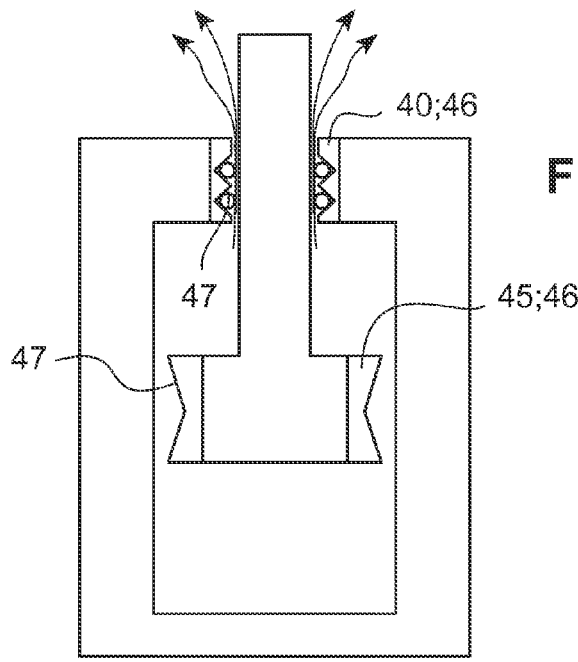
FIG. 3 is a diagram showing hydrodynamic bearings including at least one groove.

Elements present in more than one of the figures are given the same references in each of them.

DETAILED DESCRIPTION OF THE INVENTION

FIG. 1 shows a portion of an aircraft 1.

The aircraft has a hydraulic system 10 in a first variant for controlling control members of the aircraft.

In the example shown, the aircraft 1 has a rotor 2. The rotor 2 is provided with a hub 3 carrying a plurality of blades 4. The hub 3 is driven in rotation by a gearbox 61 via rotor mast 3'.

Under such circumstances, the hydraulic system acts on the pitch control of the blades 4 of the rotor 2.

Such a rotor 2 may be a so-called "main" rotor providing the aircraft with at least some of its lift and possibly also with propulsion. The rotor 2 may equally well be a "tail" rotor that contributes to controlling yaw movement of the aircraft.

Nevertheless, the invention applies to any type of control member of an aircraft.

Independently of the variant, the hydraulic system 10 comprises at least one servo-control 20.

For example, the hydraulic system may have three or four servo-controls 20 connected to flight controls of the aircraft.

In addition, each servo-control 20 may for example be hinged directly via at least one link to a set 90 of swashplates, or the equivalent.

Thus, each servo-control 20 is hinged by way of example via a hinge to a set 90 of swashplates or the equivalent. The hinge may be carried by a drive rod or by a cylinder of the servo-control. Optionally, at least one link of the servo-control may be interposed between said drive rod or said cylinder and said hinge.

Such a set 90 of swashplates comprises a non-rotary swashplate 91 hinged to a stationary scissors linkage 94.

In addition, the set 90 of swashplates includes a rotary swashplate 92, which is hinged to a rotary scissors linkage (not shown). This scissors linkage is said to be "rotary" since it is constrained to rotate with the rotor mast 3', for example.

The rotary swashplate 92 may also be connected to each of the blades 4 via a pitch rod 93.

In addition, the non-rotary swashplate 91 and the rotary swashplate 92 are arranged on a ball joint 95 that is slidably mounted on a mast for driving the hub, and thus the rotor, in rotation.

Under such circumstances, each servo-control comprises an actuator 22 and a hydraulic valve 21. The hydraulic valve 21 is in fluid flow communication with a hydraulic circuit and with the actuator. The hydraulic valve is also connected to electrical or mechanical flight controls (not shown), for example.

The actuator 22 of a servo-control has a drive rod 30 passing through at least one cylinder 25. The drive rod 30 carries one piston 35 per cylinder. Each piston subdivides a cavity inside a cylinder into an extension chamber 26 and a retraction chamber 27, each in fluid flow communication with the hydraulic valve.

Thus, the flight controls enable the hydraulic valve to be controlled. The hydraulic valve then injects fluid 23 into the extension chambers of the actuator in order to extend the actuator, or into the retraction chambers of the actuator, in order to retract the actuator.

In addition, at least one servo-control of the hydraulic system is dimensioned to present a leak 24 of fluid 23 that is under control and predefined. For example, an actuator of a servo-control is dimensioned to present a leak 24 of fluid 23 that is controlled and predefined. Such a servo-control is thus a servo-control with controlled leakage, and it cannot be considered as being a servo-control that presents an accidental leak, e.g. resulting from wear of gaskets.

Preferably, all of the servo-controls of the hydraulic system are controlled-leakage servo-controls of the invention.

Under such circumstances, each controlled-leakage servo-control includes main sealing means 40 with controlled leakage at each interface between a drive rod and a cylinder.

Such main sealing means with controlled leakage 40 allow a leak 24 of the fluid 23 contained in a cylinder to flow towards the outside of the actuator of the servo-control.

In addition, secondary sealing means 45 with controlled leakage are arranged between at least one cylinder 25 and the piston 35 sliding inside the cylinder.

Such secondary sealing means 45 then allow a leak of a hydraulic fluid to flow between the retraction chamber 27 and the extension chamber 26 of the cylinder 25.

Consequently, such a servo-control need not have any gaskets that are stressed dynamically.

With reference to FIG. 2, at least one sealing means comprises a hydrodynamic bearing 46. For example, each sealing means comprises such a hydrodynamic bearing.

Thus, when a hydraulic valve feeds the extension chamber of the cylinder represented by channels that are not shown, the fluid 23 escapes from the retraction chamber. More precisely, the fluid escapes to the outside of the servo-control via main sealing means 40 along arrows F1 and towards the extension chamber via secondary sealing means 45 via arrows F2.

The secondary sealing means 45 also allow a leak from the extension chamber to the retraction chamber.

These leaks are calibrated and taken into account by the manufacturer when designing the hydraulic system.

With reference to FIG. 3, at least one hydrodynamic bearing may include expansion grooves 47.

Figure 4:
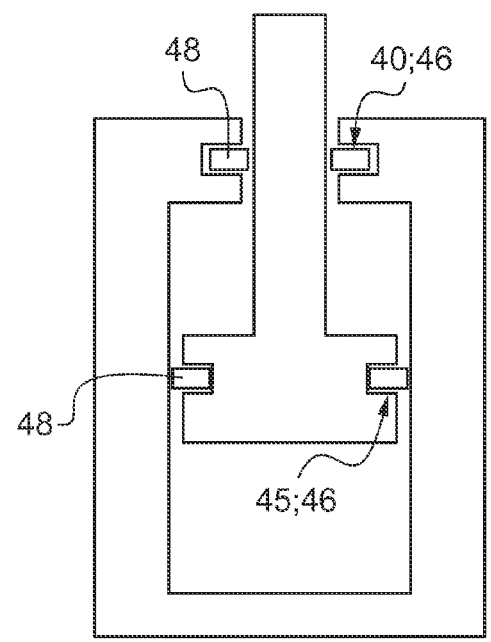
FIG. 4 is a diagram showing hydrodynamic bearings including segments.

With reference to FIG. 4, at least one hydrodynamic bearing 46 may include expansion segments 48.

Furthermore, the servo-control is advantageously a single-cylinder servo-control, i.e. a servo-control having an actuator with only one cylinder.

Figure 5:
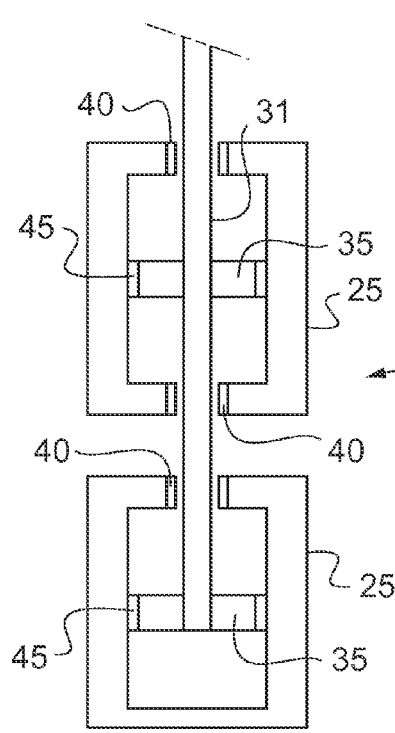
FIG. 5 shows a two-cylinder servo-control of the invention.

Nevertheless, FIG. 5 shows a multi-cylinder servo-control, more precisely a servo-control having an actuator with two cylinders in this example.

In FIG. 5, the two cylinders are arranged in tandem. Nevertheless, the two cylinders could be arranged in parallel.

Furthermore, the hydraulic circuits feeding the cylinders may be segregated.

With reference to FIG. 1, the hydraulic circuit has at least one enclosure 50 for containing the leak of fluid from at least one servo-control 20 of the invention.

At least one servo-control is arranged at least in part inside an enclosure 50. Advantageously, all of the servo-controls for controlling a member are arranged at least in part within an enclosure 50.

More precisely, the cylinders of each of the servo-controls having primary sealing means are arranged inside an enclosure 50. Nevertheless, a controlled-leakage servo-control could also be located completely within an enclosure 50.

Under such circumstances, the fluid escaping from such a servo-control is collected by the enclosure 50. This enclosure 50 may be completely leaktight.

In the context of a rotor, the enclosure may also receive other pieces of equipment that may be lubricated by the fluid that escapes from the servo-controls in controlled manner. For example, the enclosure may surround the mast of a rotor and may receive the set 90 of swashplates.

For example, the enclosure may have an inner peripheral wall 101, an outer peripheral wall 102, a bottom 103, and a top 104. The ball joint 95 of the set 90 of swashplates can thus slide on the inner wall 101, this inner wall 101 surrounding the mast 3' of the rotor.

Furthermore, the servo-control may be fastened to a wall of the enclosure, e.g. its bottom 103.

Furthermore, the enclosure may communicate with a hydraulic circuit for enabling the collected fluid to be used.

The hydraulic circuit may be the hydraulic circuit feeding the hydraulic valves of the controlled-leakage servo-controls, and it may be shared with other pieces of equipment.

For example, the enclosure is in fluid flow communication, e.g. under gravity, with a tank 80. The tank 80 may optionally be in fluid flow communication with a hydraulic valve 21 of at least one servo-control 20, or with a hydraulic circuit 190. Such a hydraulic circuit may be the hydraulic circuit 191 of a gearbox.

In the first variant of FIG. 1, the enclosure 50 is fastened to a structure of the aircraft, e.g. to a frame of the fuselage 5.

Figure 6:
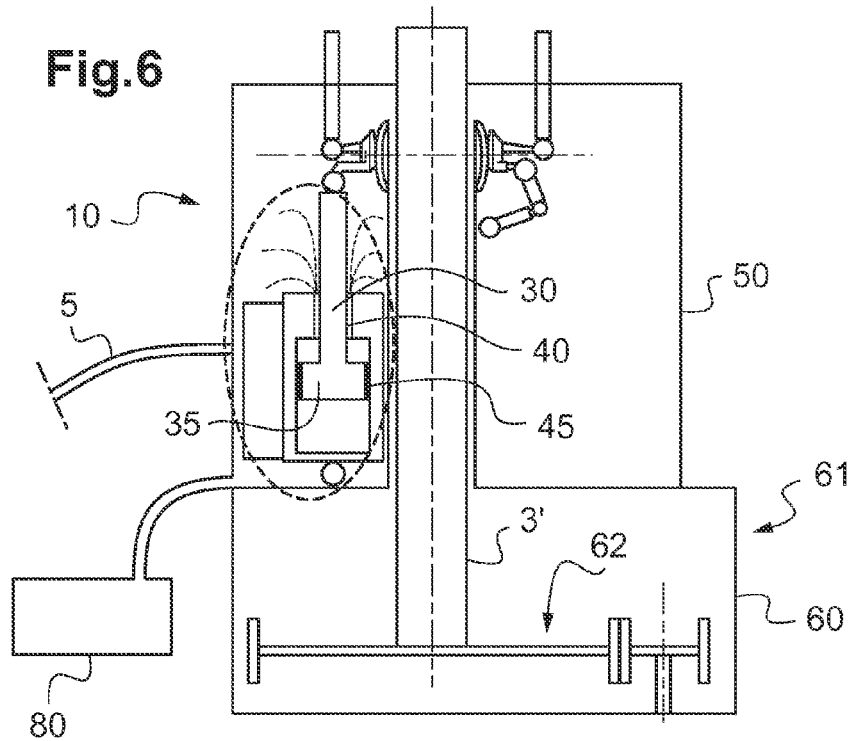
FIG. 6 is a diagram of a rotor having a hydraulic system in a second variant.

In the second variant of FIG. 6, the enclosure 50 is fastened to the casing 60 of a gearbox 61. By way of example, this gearbox 61 includes at least one speed-reduction stage 62 for rotating the mast 3' of a rotor.

Figure 7:
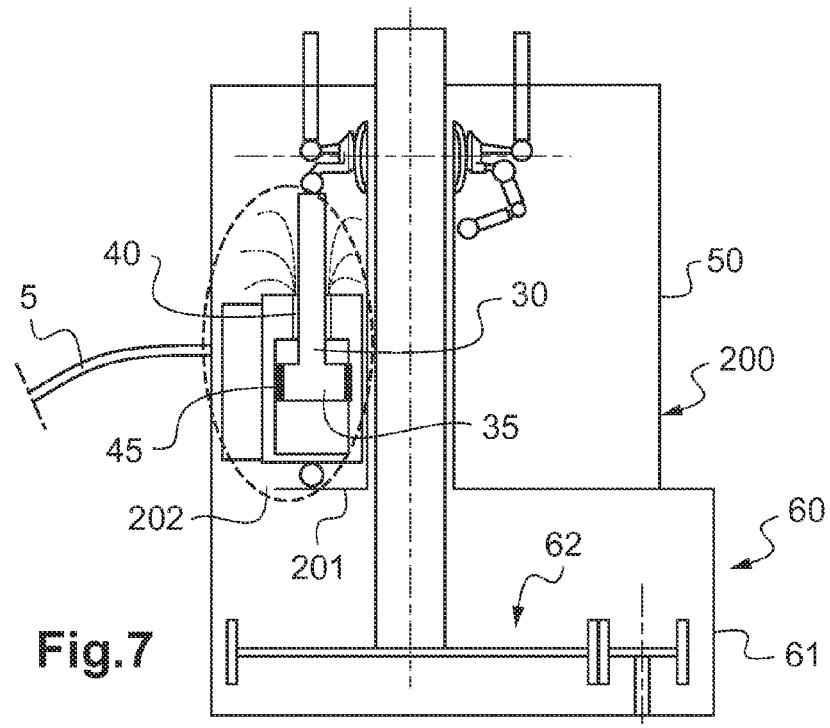
FIG. 7 is a diagram of a rotor having a hydraulic system in a third variant.

In the third variant of FIG. 7, the enclosure 50 comprises the casing 60 of a gearbox.

Consequently, the enclosure 50 and the casing 60 together form a single container 200. The speed-reduction stages of the gearbox and at least one controlled-leakage servo-control are arranged inside this container.

Optionally, the container may have perforated separators 201. For example, a separator 201 having openings 202 is arranged between a compartment of the container receiving at least one speed-reduction stage and a compartment of the container receiving at least one servo-control.

In the fourth variant of FIG. 8, the enclosure may also be arranged within a casing 60 of a gearbox.

Independently of the variant, and with reference to FIG. 9, the enclosure may co-operate with a cap 70 of a hub 3.

Thus, the enclosure 50 may be connected to a cap 70 by a rotary system 72, such as a ball bearing or a roller bearing, for example. A perforated partition 71 may be arranged between the hub 3 arranged in the cap and the servo-controls 20 arranged in the enclosure. In particular, pitch rods may pass through this partition.

FIG. 9 also shows fastener means 300 enabling each servo-control 20 to be fastened to an outer peripheral wall 102 of the enclosure 50. The enclosure 50 need not have an inner peripheral wall, with the mast 3' performing this function.

In addition, the enclosure 50 of FIG. 9 forms a container 200 together with the casing of the gearbox 60.

Naturally, the present invention may be subjected to numerous variations as to its implementation. Although several embodiments are described, it will readily be understood that it is not conceivable to identify exhaustively all possible embodiments. It is naturally possible to envisage replacing one or more of the means described by equivalent means without going beyond the ambit of the present invention.

What is claimed is:

1. A hydraulic system for an aircraft, the hydraulic system comprising at least one servo-control, each servo-control comprising at least one cylinder together with a drive rod and a piston arranged in each cylinder, the drive rod of a servo-control being secured to each piston of the servo-control, the drive rod of a servo-control passing through the corresponding cylinder of the servo-control, at least one servo-control presenting between each cylinder of the servo-control and the drive rod of the servo-control a main sealing means with controlled leakage allowing a leak of a hydraulic fluid out from the cylinder, the hydraulic system including at least one enclosure, each cylinder of the servo-control being arranged inside the enclosure so that the fluid is collected in the enclosure, wherein the hydraulic system includes a cap for surrounding a hub of a rotor, a rotary system directly rotationally coupling an upper end of the enclosure to a lower end of the cap and allowing relative rotary movement between the enclosure and the cap.

2. A system according to claim 1, wherein the hydraulic system has a single enclosure, the cylinders of a plurality of servo-controls being arranged inside the enclosure.

3. A system according to claim 1, wherein at least one servo-control is arranged completely inside the enclosure.

4. A system according to claim 1, wherein the enclosure, the cap, and the rotary system cooperate to form a leaktight container.

5. A system according to claim 1, wherein each piston separates a retraction chamber and an extension chamber arranged inside a cylinder, and the hydraulic system includes at least one secondary sealing means with controlled leakage, each secondary sealing means with controlled-leakage being arranged between at least one cylinder and the piston sliding inside the cylinder in order to allow a leak of a hydraulic fluid between the retraction chamber and the extension chamber of the cylinder.

6. A system according to claim 1, wherein at least one sealing means includes a hydrodynamic bearing.

7. A system according to claim 6, wherein the hydrodynamic bearing includes expansion grooves.

8. A system according to claim 6, wherein the hydrodynamic bearing includes expansion segments.

9. A system according to claim 1, wherein the hydraulic system includes a casing of a gearbox in which at least one speed-reduction stage is arranged, the enclosure being fastened to the casing.

10. A system according to claim 1, wherein the enclosure includes a casing of a gearbox having at least one speed-reduction stage arranged therein.

11. A system according to claim 1, wherein the enclosure is arranged inside a casing of a gearbox having at least one speed-reduction stage arranged therein.

12. A system according to claim 1, wherein the servo-control includes a hinge for hinging to a set of swashplates of a rotor connected to each blade of the rotor by a pitch rod.

13. A system according to claim 1, wherein the hydraulic system includes a fluid tank in fluid flow communication with the enclosure.

14. A system according to claim 13, wherein the fluid tank is in fluid flow communication with a hydraulic valve of at least one servo-control.

15. A system according to claim 1, wherein at least one servo-control has a single cylinder.

16. A rotor having a hub carrying a plurality of blades, wherein the rotor includes a hydraulic system according to claim 1, each servo-control being mechanically connected to each blade.

17. A rotor according to claim 16, wherein the rotor includes a set of swashplates connected to each blade by a pitch rod, each servo-control being connected to the set of swashplates, the set of swashplates being arranged inside the enclosure, the rotary system positioned between the swashplates and the hub, the rotary system and the cap spaced apart from the swashplates.

18. An aircraft, including a rotor according to claim 16.

19. A hydraulic system for an aircraft, the hydraulic system comprising:
    an enclosure defining a first cavity surrounded by an upper end of the enclosure;
    a cap defining a second cavity surrounded by a lower end of the cap, the second cavity to receive and surround a hub of a rotor;

a rotary bearing system directly rotationally coupling the upper end of the enclosure and the lower end of the cap for relative rotary movement between the enclosure and the cap;

a servo-control having a cylinder with a drive rod and a piston arranged in the cylinder, the drive rod of the servo-control being secured to the piston, the drive rod passing through the cylinder; and a hydrodynamic bearing positioned between the cylinder and the drive rod of the servo-control, the hydrodynamic bearing allowing leakage thereacross for a controlled leak of a hydraulic fluid out of the cylinder;

wherein the cylinder of the servo-control is positioned within the enclosure such that the leak of the fluid is collected in the enclosure.

20. The hydraulic system of claim 19 wherein the hydrodynamic bearing is a first hydrodynamic bearing, the system further comprising:

a second hydrodynamic bearing positioned between the piston and the cylinder of the servo-control, the second hydrodynamic bearing allowing leakage thereacross for a controlled leak of the fluid across the piston and between an extension chamber and a retraction chamber in the cylinder separated by the piston; and a perforated partition positioned between the enclosure and the cap such that pitch rods connecting the hub to a set of swashplates to the hub pass through the partition, the set of swashplates positioned within the first cavity and spaced apart from the cap and enclosure, the set of swashplates positioned between the rotary bearing system and the cylinder of the servo-control.

* * * * *